(12) United States Patent
Johnson

(10) Patent No.: US 7,089,566 B1
(45) Date of Patent: Aug. 8, 2006

(54) METHOD FOR ACCESSING OBJECT LINKING-EMBEDDING DATABASE DATA VIA JAVA DATABASE CONNECTIVITY

(75) Inventor: Peter Johnson, Foothill Ranch, CA (US)

(73) Assignee: Unisys Corporation, Blue Bell, PA (US)

( * ) Notice: Subject to any disclaimer, the term of this patent is extended or adjusted under 35 U.S.C. 154(b) by 827 days.

(21) Appl. No.: 10/071,815

(22) Filed: Feb. 7, 2002

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................. 719/328; 719/313
(58) Field of Classification Search ................ 717/116, 717/118; 719/310–320, 328–330
See application file for complete search history.

(56) References Cited

U.S. PATENT DOCUMENTS

| | | | |
|---|---|---|---|
| 5,689,664 A | 11/1997 | Narayanan et al. | |
| 5,848,273 A | 12/1998 | Fontana et al. | |
| 5,893,118 A | 4/1999 | Sonderegger | |
| 5,910,804 A | 6/1999 | Fortenbery et al. | |
| 6,016,499 A | 1/2000 | Ferguson | |
| 6,470,349 B1 * | 10/2002 | Heninger et al. | 707/102 |
| 6,886,172 B1 * | 4/2005 | Sanchez, II | 719/328 |

OTHER PUBLICATIONS

Jose A. Blakeley, "OLE DB: A Component DBMS Architecture", 1996 IEEE, pp. 203-204.*
Jose A. Blakeley, "Data Access for the Masses through OLE DB", 1996 ACM, pp. 161-172.*
Sun Microsystems, JDBC-ODBC Bridge Driver, 1996-1999, pp. 1-3.*
Linthicum, Database-Oriented Middleware, DM Review, Nov. 1999, pp. 1-11.*
Ivey et al, Using Open Access Technology to Integrate SAS and ESRI Applications, pp. 1-7.*
Attunity Ltd, Attunity Connect Architecture, 2001, pp. 1-17.*

* cited by examiner

*Primary Examiner*—William Thomson
*Assistant Examiner*—Diem Cao
(74) *Attorney, Agent, or Firm*—Alfred W. Kozak; Mark T. Starr; Lise A. Rode

(57) ABSTRACT

A method for enabling database access to an OLE DB compatible database by a client using a JAVA JDBC Application Program Interface. A JDBC Driver program provides a bridging functionality between the using JDBC client and the OLE DB database.

17 Claims, 12 Drawing Sheets

METHOD FOR ACCESSING OBJECT LINKING-EMBEDDING DATABASE DATA VIA JAVA DATABASE CONNECTIVITY

FIELD OF THE INVENTION

This disclosure provides a mechanism that enables a JAVA application to use JAVA database connectivity (JDBC) to access data made available by an object-linking and embedding database data provider.

CROSS-REFERENCES TO RELATED APPLICATIONS

This application is related to a previously filed application entitled "Method For Accessing Hierarchical Data Via JDBC", filed on Oct. 30, 2001, which issued as U.S. Pat. No. 6,845,376 B1.

BACKGROUND OF THE INVENTION

The specification for the JDBC API is a document which is the JAVA platform standard call-level application program interface (API) for database access. This API assumes that the database being connected to is a relational database. It is understood that relational databases have flat table structures where tables consist solely of columns and rows.

An on-line linking and embedding database is the preferred application program interface (API) for Microsoft and is used by applications running on a Window-based PC to access data from a variety of data sources, including databases both relational and non-relational, flat files, directory services and so on. JDBC (JAVA Database Connectivity) is the JAVA Application Program Interface (API) used to access data in relational databases. While typical Windows programs written in C++ or Visual Basic had, in the OLE DB (Online Linking and Embedding Database), a standardized mechanism for accessing data in a variety of data sources, however, the JAVA applications were limited to accessing only relational data sources. It is desirable to provide JAVA applications which have access to the same data as other Windows applications.

The present system and method provides a mechanism which enables a JAVA application to use JAVA database connectivity (JDBC) to access data which is made available by an OLE DB data provider.

The OLE DB API provides four basic objects that are used to access data. Each object implements a series of required and optional interfaces. The JDBC API defines over a dozen objects that can be used to access data. The JDBC driver for the OLE DB data access (designated as a Driver in this document) maps the dozen objects defined by the JDBC API to the objects in the OLE DB API. This includes mapping the methods on the JDBC object to the various interfaces on the OLE DB objects. Additionally, the OLE DB API requires that only three of the four basic objects actually be implemented. Thus, part of the solution concerns here, concerns how the Driver handles situations where an OLE DB data provider does not support an optional object or interface that is required to complete a JDBC call.

In the related prior art, there have been seen a number of systems which may be related somewhat partially to the present disclosure. These systems involve U.S. Patents which are briefly described hereinunder.

U.S. Pat. No. 6,016,499 entitled "System And Method For Accessing A Directory Service Repository" describes a method for using a relational API to data stored in another format, in this particular case for directory data, using an Application Program Interface (API) native to data. However, the present disclosure is considerably different in that it uses the JDBC API (while the cited patent uses ODBC) and the present system provides access to any data that uses OLE DB as an application program interface.

Another U.S. Pat. No. 5,893,118 is entitled "Method For Managing Globally Distributed Software Components" and describes a mechanism for locating a JAVA class using a directory service. The present invention is quite considerably different in that it is a bridge from JDBC over to the OLE DB.

Another U.S. Pat. No. 5,848,273 entitled "Method For Generating OLE Automation And IDL Interfaces From MetaData Information" describes a mechanism for generating an OLE-based API from repository MetaData. The present system and method is quite different in that no API is generated, but rather instead the system uses an existing API, namely the JDBC. Additionally, the present disclosure actually does make use of the OLE DB API.

Another possible relevant patent is U.S. Pat. No. 5,689,664 entitled "Interface Sharing Between Objects" which concerns a mechanism for reducing memory usage when an object is shared by two different processes, typically using a drag-and-drop operation. However, quite contrarily, the present system concerns database access, rather than reducing memory usage.

A further U.S. Pat. No. 5,910,804 entitled "OLE For Design And Modeling" is used to describe several tools used to do 3-D modeling and has an interface, in OLE, used by those tools to communicate the data concerning the object being modeled. This particular system is quite different from the present invention, since the present invention translates JDBC API calls into the appropriate OLE DB API calls, thus to enable JAVA applications to access data available via the OLE DB.

The presently described system can map a dozen objects as defined in the JDBC API and map them to objects in the OLE DB API.

SUMMARY OF THE INVENTION

The system and method of the present invention provides a mechanism which enables a JAVA application to use the JAVA database connectivity (JDBC) program to access data which is made available by an object-linking and embedding database data provider (OLE DB).

While Online Embedded Database API (OLE DB) is the preferred API for applications running on Windows-based PC's to access data from many types of data sources, (including relational and non-relational databases), however, JDBC (Java Database Connectivity) is the JAVA Application Program Interface (API) used to access data in relational databases.

In the OLE DB, typical Windows programs written in C++ or Visual Basic had a standard mechanism for accessing data in a variety of data sources. However, JAVA applications were limited to access onto only relational databases.

The present method enables JAVA applications with access to all the same types of data as do the other Windows applications using OLE DB. This is accomplished via a JDBC "Driver" which "maps" the dozen objects defined by the JDBC API to the objects in the OLE DB API.

Since the OLE DB API provides 4 basic objects to access data (where each object implements a series of required and optional interfaces) and the OLE DB API requires only 3 of the 4 basic objects to be implemented, the present method provides a JDBC Driver to handle each situation where the OLE DB data provider does not support an optional object or interface required to complete a JDBC call.

GLOSSARY OF RELEVANT TERMS

Figure 1:
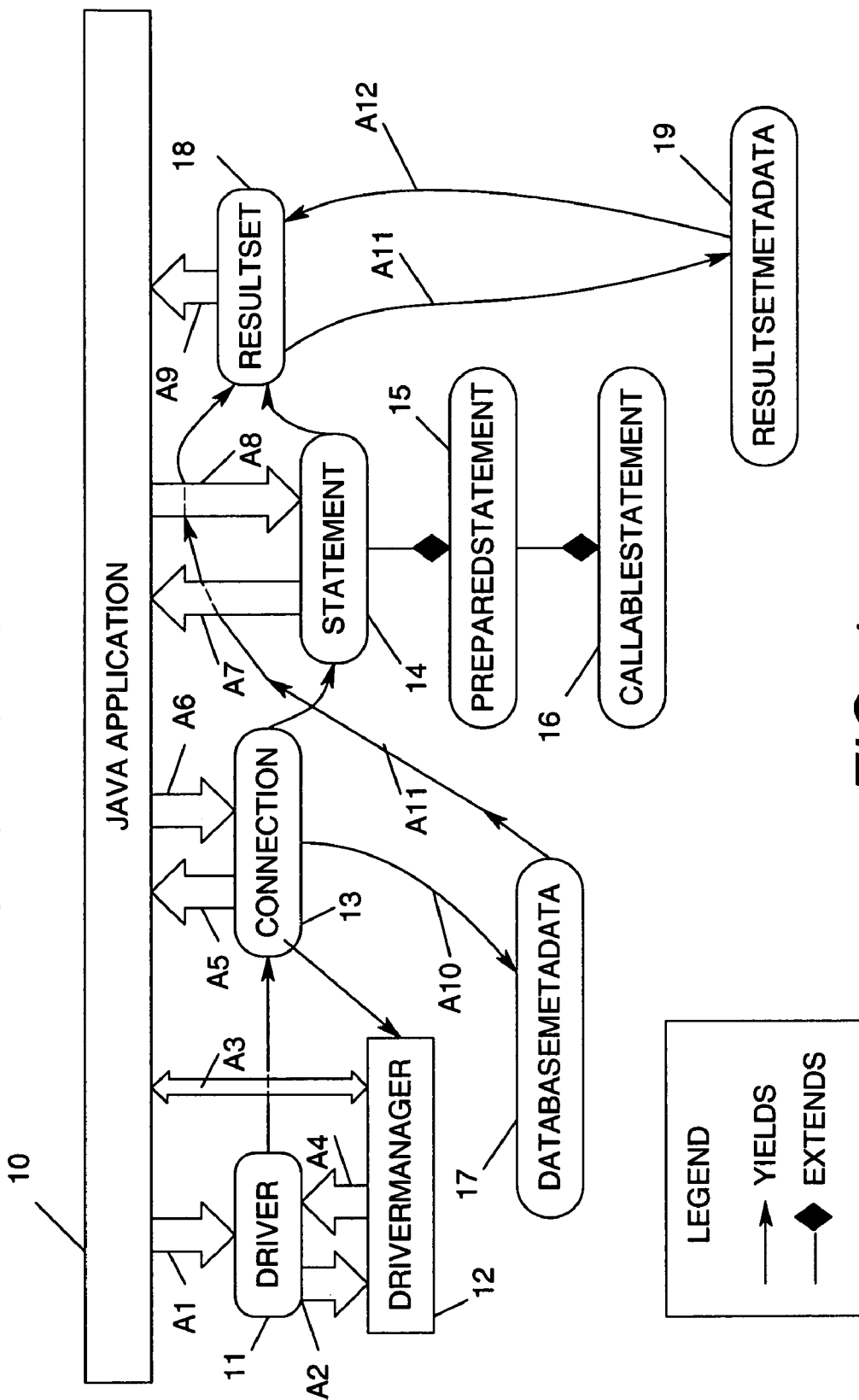
FIG. 1 is a illustration showing the classes and interfaces for the JAVA database connectivity specification program.

1. API: This represents an application programming interface. A set of routines used by an application program to direct the performance of procedures by the computer's operating system.
2. C++: An object-oriented version of the C programming language developed in the early 1980's at Bell Laboratories, and adopted by a number of vendors.
3. C++ OBJECTS: Objects define in software written in the C++ language.
4. DESCENDANT: In object-oriented programming, a class (group) that is a more specialized form of another higher level class, thus, a descendant table would be a more specialized form of a higher level table, such as a parent table.
5. DL/I.TM: This represents an object in an application's views database which is the root of an object's framework and a root for a collection of application views in the IBM information management system database.
6. DMSII: This represents a data management system formulated by the Unisys Corporation of Blue Bell, Pa.
7. DRIVER (JDBC): This is a software program that implements the JDBC specification.
8. EMBEDDED RESULT SET (FOR THE COLUMN): A result set used to represent hierarchical data for a level other than the outermost parent level. An embedded result set always represents the value of a column in a parent result set.
9. EMBEDDED RESULT SET OBJECTS: Once or more objects that represent embedded result sets.
10. FLAT-FILE DATABASE: A database that takes the form of a table, where only one table can be used for each database. A flat-file database can only work with one file at a time.
11. getObject method: See Glossary Item #49.
12. HIERARCHICAL DATABASE: A database in which records are grouped in such a way that their relationships form a branching tree-like structure. This type of database structure, most commonly used for with databases for large computers, is well-suited for organizing information that breaks down logically into successively greater levels of the table.
13. IMS.TM: This represents the information management system which is an IBM database management system to manage computerized databases.
14. INSTANTIATE: To create an instance of a class. An "instance" is an object in object-oriented programming, in relationship to the class to which it belongs. For example, an object MYLIST that belongs to a class LIST, is an instance of the class "List".
15. INTERNET BROWSER: An application used to view pages on the World-Wide-Web. Many e-business applications use internet browsers to present their user interface. So it becomes the GUI for such applications. Such applications also make use of a JDBC driver to access data in a database.
16. J2EE APPLICATION: A Java application written to conform to the Java 2 Platform, Enterprise Edition specification.
17. J2EE APPLICATION SERVER: A Java application written to the Java 2 Platform, Enterprise Edition specification. Many e-business applications are written to run within a J2EE application server, which provides a container for such application. A J2EE Application Server accesses database data via a JDBC driver.
18. JAVA APPLICATIONS: An application written in the Java language. The application will access data in a database via the JDBC driver.
19. JAVA CLASS NAME: The name of the Java class used as the type of the value of a column in a result set. The value for said column is made available to a Java program as an instance of said Java class.
20. JAVA CLASS NAME (FOR GIVEN COLUMN IN A RESULT SET): (See JAVA CLASS NAME above)
21. JAVA.SQL.RESULT SET: The full name of the ResultSet class in the Java language.
22. JAVA.SQL.TYPES.OTHER: A value for the JDBC type of a column. This value is defined by the JDBC API specification.
23. JDBC: This acronym indicates Java Data Base Connectivity, which is used to access data in a particular database involved.
24. JDBC API SPECIFICATION: A document from Sun Microsystems, Inc. that describes the JDBC API. This document designated JDB™ API is the Java™ platform standard call-level API for database access. The document contains the final specification of the core JDBC 2.1 API which is Copyright 1999 by Sun Micro Systems, Inc. 901 San Antonio Road, Palo Alto, Calif. 94303.
25. JDBC DRIVER: Software that implements the JDBC API specification. It provides remote access to database data. That is, that database is on another computer, and a first JDBC Driver communicates with a second JDBC driver to provide access to the data in that database.

26. JDBC DRIVER: Software that implements the JDBC API specification and provides access to data in a database.
27. JDBC TYPE: The type, as defined by the JDBC API specification, of a column in a result set.
28. LDAP: This represents lightweight directory access protocol implemented by the IBM Corporation.
29. LOGICAL DATA ACCESS LAYER: A layer of software used to map the physical data, as stored in a database, to a logical view of that data.
30. LOGICAL ENTITY TYPES: Types that do not represent physical storage of data, but rather a rearranging of that data used to represent a specific object model.
31. LOGICAL ENTITY TYPES-ATTRIBUTE NAMES: Names of the attributes of logical entity types.
32. METADATA: This is data about data. For example, the title, subject, author, and size of a file, constitute metadata about the file.
33. METADATA COLLECTION: One or more result set metadata objects that are tracked by a result set object.
34. METADATA VALUE: The metadata associated with a given entity.
35. METAFILE: A file that contains or defines other files. Many operating systems use metafiles to contain directory information about other files on a given storage device.
36. NEWLY CREATED RESULT SET METADATA OBJECT: A result set metadata object that is created to represent the metadata in a result set.
37. NORMAL FASHION: This represents processes already defined by the JDBC API specification.
38. NT SERVER: A computer running an operation system based on Microsoft's NT technology, such as Windows 2000 or Windows NT 4.0. The Java application JDBC driver and OLE DB data provider all run on this computer.
39. OBJECT: This is designation for object code (machine readable code). In object oriented programming, a variable comprising both routines and data that is treated as a discrete entity.
40. OBJECT MODEL: The structural foundation for an object-oriented language, such as C++. This foundation includes such principles as abstraction, concurrency, encapsulation, hierarchy, persistence, polymorphism, and typing.
41. OLE: This represents object linking and embedding. This is a technology for transferring and sharing information among applications. When an object, such as an image file is created with a "paint" program, it is then linked to a compound document, such as a spreadsheet or a document created with a word processing program. The document contains only a reference to the object; any changes made to the contents of a linked object will be seen in the compound document. When an object is embedded in a compound document, the document contains a copy of the object; any changes made to the contents of the original object will not be seen in the compound document, unless the embedded object is updated.
42. OLE DB DATA PROVIDER: Software that implements the Microsoft OLE DB API specification. It provides the interface between the JDBC driver and the database. The code that implements the OLE DB API for a particular database is known as the OLE DB data provider.
43. PARENT RESULT SET OBJECT: A result set object that contains embedded result set objects.
44. PARENT TABLE: Pertaining or constituting relationship between two nodes in a tree data structure in which the parent is one step closer to the root, that is to say, one level higher than the descendent or child.
45. PHYSICAL TABLES: The actual tables defined in a relational database.
46. QUERY: This is the process of extracting data from a database and presenting it for use. It involves a specific set of instructions for extracting a particular data repetitively through a program sequence.
47. RELATIONAL DATABASE: A database or database management system that stores information in tables—rows and columns of data—and conducts searches by using data in specified columns of one table to find additional data in another table. In relational database, the rows of a table represent records (collections of information about separate items) and the columns represent fields (particular attributes of a record). In conducting searches, a relational database matches information from a field in one table with information on a corresponding field of another table to produce a third table that combines requested data from both tables.

For example, if one table contains the fields EMPLOYEE-ID, LAST-NAME, FIRST-NAME, HIRE-DATE—and another table contains the fields DEPT, EMPLOYEE-ID, SALARY,—a relational database can match the EMPLOYEE-ID fields in the two tables to find such information as the names of all employees earning a certain salary or the departments of all employees hired after a certain date. Thus, relational database uses matching values in two tables to relate information in one table to information in the other table.

48. RESULT SET: A type in the JDBC API used to define data returned by a database in response to a query.
49. RESULT SET.GET OBJECT: A method defined on the ResultSet type used to obtain the value of a column in the current row of the result set.
50. RESULT SET (HIERARCHICAL DATABASE): For a hierarchical database, the data at each level of the hierarchy is represented in Java as a result set.
51. RESULT SET METADATA: A class that defines the metadata associated with a result set.
52. RESULT SET METADATA.GET COLUMN TYPE: A method defined on the ResultSetMetadata class that is used to obtain the JDBC type of a given column in a result set.
53. RESULT SET METADATA OBJECT: An instance of the ResultSetMetadata class.
54. ROW CURSOR: An entity employed by a result set to mark the currently accessed row of a result set.
55. STORAGE: Represents the database, in this case, a hierarchical database. It contains the data being accessed.

Extended Glossary Items:
X1. JDBC CLASSES: Classes (used in object-oriented programming sense) that implement the JDBC API.
X2. JDBC INTERFACES: Interfaces (used in the object-oriented programming sense, also used in COM) that define the JDBC API.
X3. DriverManager: A class defined in the JDBC API that is used to manage JDBC drivers. JDBC drivers register themselves with the DriverManager, and client applications request JDBC drivers from the DriverManager.

X4. CONNECTION(FIG. 1): An interface defined in the JDBC API that is used to represent the connection between a Java application and a database.

X5. STATEMENT: An interface defined in the JDBC API that is used to represent an SQL statement.

X6. PREPARED STATEMENT: An interface defined in the JDBC API that is used to represent an SQL statement that has been pre-processed by the database.

X7. CALLABLE STATEMENT: An interface defined in the JDBC API that is used to represent the invocation of a stored procedure in the database.

X8. ResultSetMetaData: An interface defined in the JDBC API that is used to represent the information about (or metadata of) the data in a result set.

X9. YIELDS: Returns. In the diagram, this is meant to indicate that the interface at the starting point of the arrow contains a method that returns the interface indicated by the ending point of the arrows.

X10. OBJECT: An instance of a class (in the classic object-oriented sense)

X11. DATASOURCE (20, FIG. 2): An object defined by the OLE DB API that represents the code used to provide database access to a client program.

X12. JDBC: JDBC stands for Java Database Connectivity, and is an API that is used by Java application to communicate with relational databases.

X13. SESSION: An object defined by the OLE DB API that represents the connection between a client application and a database.

X14. ROWSET: An object defined by the OLE DB API that represents the data returned by a database from a query on the database.

X15. ICOMMAND: An interface on the Command object in the OLE DB API that enables a client application to execute a command, such as an SQL statement, against a database.

X16. IOPENROWSETU: An interface on the Sessions object in the OLE DB API that enables a client application to access the data in a table in the database.

X17. OLE DB OBJECTS: Objects (in the object-oriented sense) that are defined by the OLE DB API.

X18. NATIVE METHODS: The mechanism defined in the Java language that enables a Java application to invoke functions written in other languages, typically the C and C++ languages.

X19. DATA LINK LIBRARY: A program library that enables the Java portion of this invention to communicate with an OLE DB data provider. The data link library is part of this invention.

X20. JDBC DRIVER: An implementation of the JDBC API. A JDBC Driver provides Java clients with access to data in a database. This invention describes a specific JDBC Driver.

x21. OLE DB DATA PROVIDER: An implementation of the OLE DB API. An OLE DB Data Provider provides applications with access to data in a database.

X22. DataBaseMetaData: An interface defined in the JDBC API that is used to represent the data about the data stored in a database. Such data includes things such as what tables and columns are defined in the database.

X23. JResultSet: An interface defined in the JDBC API that is used to represent the connection between a Java application and a database.

X24. JDriver Object: An instance of the JDriver class, which is written in Java, and implements the Driver interface defined by the JDBC API. This class is part of this invention.

X25. CSession Object: An instance of the CSession class, which is written in C++, that provides the implementation of the native methods necessary to allow communication between the JSession class and the OLE DB API. This class is part of this invention.

X26. JStatement Object: An instance of the JStatement class, which is written in Java, and implements the Statement interface defined by the JDBC API. This class is part of this invention.

X27. JPreparedStatement: A class, which is written in Java, that implements the PreparedStatement interface defined by the JDBC API. This class is part of this invention.

X28. JCallableStatement: A class, which is written in Java, that implements the CallableStatement interface defined by the JDBC API. This class is part of this invention.

X29. JResultSet Object: An instance of the JResultSet class, which is written in Java, and implements the ResultSet interface defined by the JDBC API. This class is part of this invention.

X30. JResultSetMetaData Object: An instance of the JResultSetMetaData class, which is written in Java, and implements the ResultSetMetaData interface defined by the JDBC API. This class is part of this invention.

X31. JDataBaseMetaData: A class, which is written in Java, that implements the DataBaseMetaData interface defined by the JDBC API. This class is part of this invention.

X32. JDatabaseMetaData Object: An instance of the JDatabaseMetaData class, which is written in Java, and implements the DatabaseMetaData interface defined by the JDBC API. This class is part of this invention.

X33. CStatement: A class written in C++, that provides the implementation of the native methods necessary to allow communication between the JStatement class and the OLE DB API. This class is part of this invention.

X34. CDriver Object: An instance of the CDriver class, which is written in C++, that provides the implementation of the native methods necessary to allow communication between the JDriver class and the OLE DB API. This class is part of this invention.

X35. CSession Object: An instance of the CSession class, which is written in C++, that provides the implementation of the native methods necessary to allow communication between the JSession class and the OLE DB API. This class is part of this invention.

X36. CStatement Object: An instance of the CStatement class.

X37. CPreparedStatement: A class written in C++, that provides the implementation of the native methods necessary to allow communication between the JPreparedStatement class and the OLE DB API. This class is part of this invention.

X38. CCallableStatement: A class written in C++, that provides the implementation of the native methods necessary to allow communication between the JCallableStatement class and the OLE DB API. This class is part of this invention.

X39. CCallableStatement Object: An instance of the CCallableStatement class.

X40. CResultSet Object: An instance of the CResultSet class.

X41. CResultSetMetaData Object: An instance of the CResultSetMetaData class, written in C++, that provides the implementation of the native methods necessary to allow communication between the JResultSetMetaData class and the OLE DB API. This class is part of this invention.

X42. CDataBaseMetaData Object: An instance of the CDataBaseMetaData class.

X43. CDataBaseMetaData: A class written in C++, that provides the implementation of the native methods necessary to allow communication between the JDataBaseMetaData class and the OLE DB API. This class is part of this invention.

X44. CResultSet: A class written in C++, that provides the implementation of the native methods necessary to allow communication between the JResultSet class and the OLE DB API. This class is part of this invention.

X45. COMMAND OBJECT: An object defined in the OLE DB API. The Command object represents a command, such as SQL statements, that can be executed against the data in a database.

X46. DATA SOURCE OBJECT: (same as Data Source (20, FIG. 2).

X47. SESSION OBJECT: (same as Session.

X48. Throw SQLException: This relates to how error handling is done in Java, which implements structured exception handling. Code that notices an error condition "throws" an exception. Other code then "catches" the exception and handles the error (usually by displaying an error message.) Both "throw" and "catch" are part of the Java language.

X49. RECORD COUNT: The number of database records affected by a command on a database.

X50. IOPENROWSET: (see IOpenRowset).

X51. ROWSET OBJECT: (same as Rowset).

X52. COLUMN INFORMATION: Information about the columns in a Rowset object.

DESCRIPTION OF PREFERRED EMBODIMENT

FIG. 1 is a drawing to illustrate how a JAVA application makes use of the JAVA Database Connectivity-Application Program Interface (JDBC API) to access data in a relational database. This diagram is oriented from the viewpoint of what the JAVA application has to do, but not from the viewpoint of what the JDBC Driver, which implements the JDBC API, has to do.

FIG. 1 shows a JAVA application 10 connected to a Driver 11, a Connection unit 13 and a ResultSet 18. The Driver unit 11 connects for two-way communication to the DriverManager 12, while the Connection unit 13 connects to the DatabaseMetaData 17 which connects to the ResultSet 18.

The JAVA application 10 also inter-communicates with the Statement 14, which is generated by the Connection unit 13 and provides output as a ResultSet 18. The Statement 14 extends to the PreparedStatement 15 which extends to the CallableStatement 16. The ResultSet 18 provides a connection to the ResultSetMetaData 19.

The interrelational operations of FIG. 1 are shown in a series of steps designated A1 through A12, as follows.

At step A1, the JAVA application uses reflection to load the Driver class 11.

At step A2, the Driver class, during initialization, creates one instance of itself and registers that instance with the DriverManager class 12. The Driver class 11 is a singleton.

At step A3, the JAVA application requests a connection from the DriverManager 12 via the passing of a connection string.

At step A4, the DriverManager 12 asks the Driver 11 if the Driver recognizes the Connection string.

At step A5, if the Driver does recognize the string, it creates a Connection object 13 and returns it to the DriverManager 12 which returns the Connection to the JAVA application, 10.

At step A6, the JAVA application then asks the Connection 13 for a Statement 14. This is for one-time use in SQL statements, and for a PreparedStatement 15 (used for multiple-use SQL statements that can take input parameters) or asks the Connection 13 for a CallableStatement 16 (for multiple use SQL statements that can take input and output parameters).

At step A7, the Connection 13 creates the desired Statement object 14 and returns it to the JAVA application, 10.

At step A8, the JAVA application then executes the Statement. If the SQL statement is an update (or other non-query), the Statement object returns to the JAVA application an indication of how many rows were updated in the database, 40.

At step A9, if the SQL statement is a query, the Statement object 14 returns a ResultSet object 18 to the JAVA application.

At step A10, the JAVA application can then request information about the database 40 from the Connection object 13. The Connection object returns a DatabaseMetaData object 17, which the application can use to get such information. It is noted that some of this information is returned in the form of a ResultSet 18 on line step A11. The ResultSet object 18 returns a ResultSetMetaData object 17 to form the ResultSet MetaData object 19 via step A12. The ResultSetNetaData object 19 is one which the JAVA application 10 can use to get information as to the ResultSet MetaData object 19.

Figure 2:
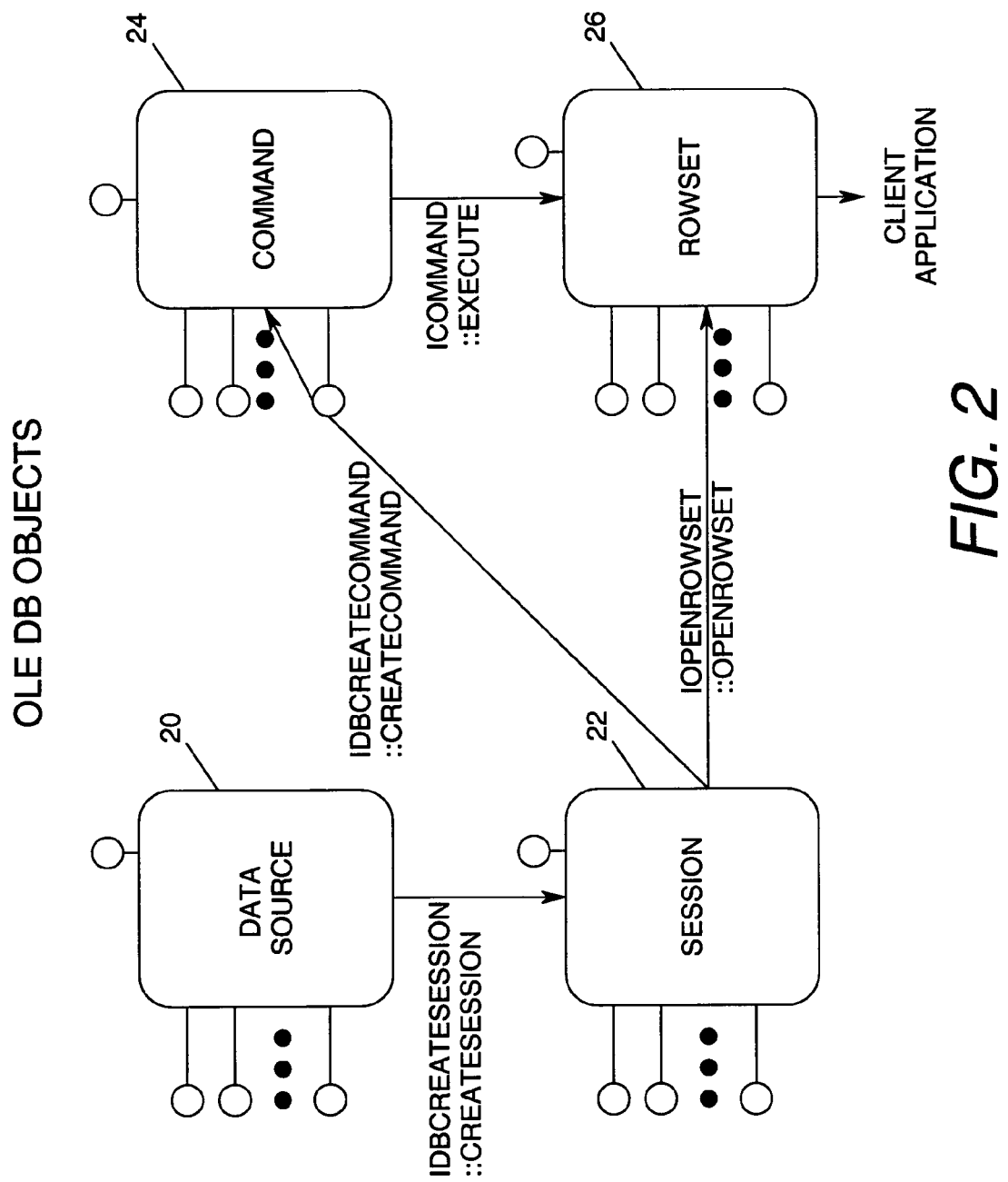
FIG. 2 is a schematic diagram showing various on-line embedding database objects and their various relationships.

FIG. 2 is a drawing illustrating the four primary objects used to access data in the database, for the OLE DB (Online Embedded Database). Shown in FIG. 2 is the Data Source object 20, the Session object 22, the Command object 24 and the Rowset object 26. Each of these objects implements multiple interfaces. The interfaces define functions that are available to a client program. These functions are what a client 8 uses to access the database 40 via the on-line embedded database OLE DB.

As indicated in FIG. 2, a Windows application that wants to use the OLE DB to access a database 40 then first creates a Data Source object 20. The application uses the CreateSession function in the IDBCreateSession interface to create a Session object 22.

The application can then use the CreateCommand function on the IDBCreateCommand interface of the Session object to create a Command object 24. The application would then develop some command text, such as an SQL statement to the Command object 24, and then call the Execute function on the ICommand interface to cause the Command text to be processed.

If the Command text yielded a table of result values, then a Rowset object 26 would be returned to the client application. The client application would use the interfaces of the Rowset object 26 to obtain the contents of the table of result values.

Alternately, the client application could directly ask for the contents of a particular table by using the Open Rowset function of the IOpenRowset interface defined for the Session object 22. This route bypasses the Command object 24.

Since the OLE DB specification states that the Command object is "optional", then the use of the openRowset function allows non-relational databases to provide an OLE DB interface, provided that the data in that database can be accessed as named in the tables of information. The code that implements the OLE DB API for a particular database 40 is known as the OLE DB data provider.

Figure 3:
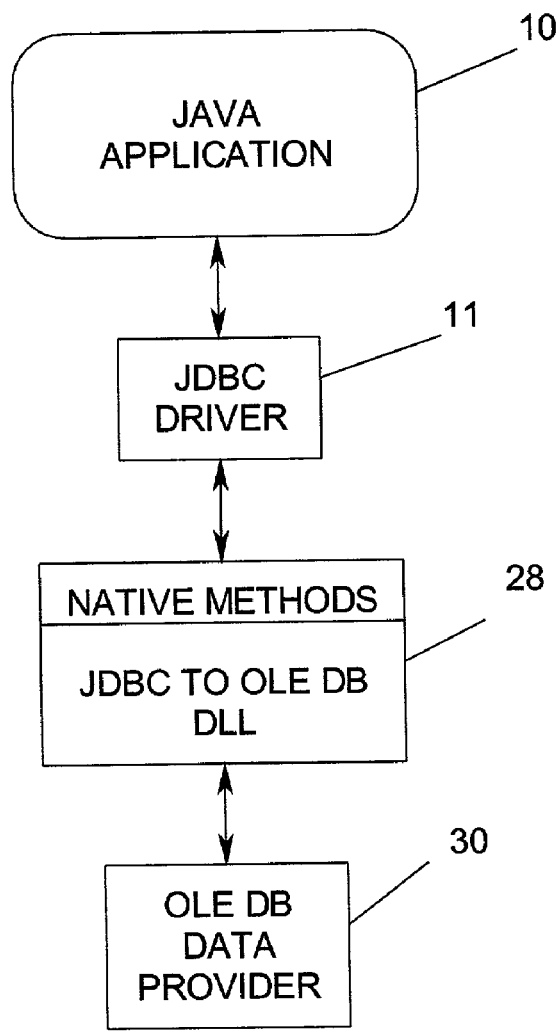
FIG. 3 is a drawing showing how a JDBC driver can act as a bridge between the JAVA application and the OLE DB data provider.

FIG. 3 is an illustration showing that where Java applications cannot use the OLE DB API to access databases, the present system and method provides a solution by defining a JDBC Driver that acts as a bridge between the JAVA application and the OLE DB data provider, 30.

Here, the solution will be seen to consist of two parts:
(i) A series of JAVA classes that implement the JDBC API and,
(ii) A Data Link library, DLL, written in C++, that implements methods defined as "native" in the JAVA classes, and acts as an OLE DB client for an OLE DB data provider.

Thus, in FIG. 3, the JAVA application 10 is linked to the JDBC Driver 11, whereupon native methods 28, using a Data Link Library, connect the JDBC to the OLE DB with the result that there is provided at block 30, a OLE DB Data Provider.

Figure 4:
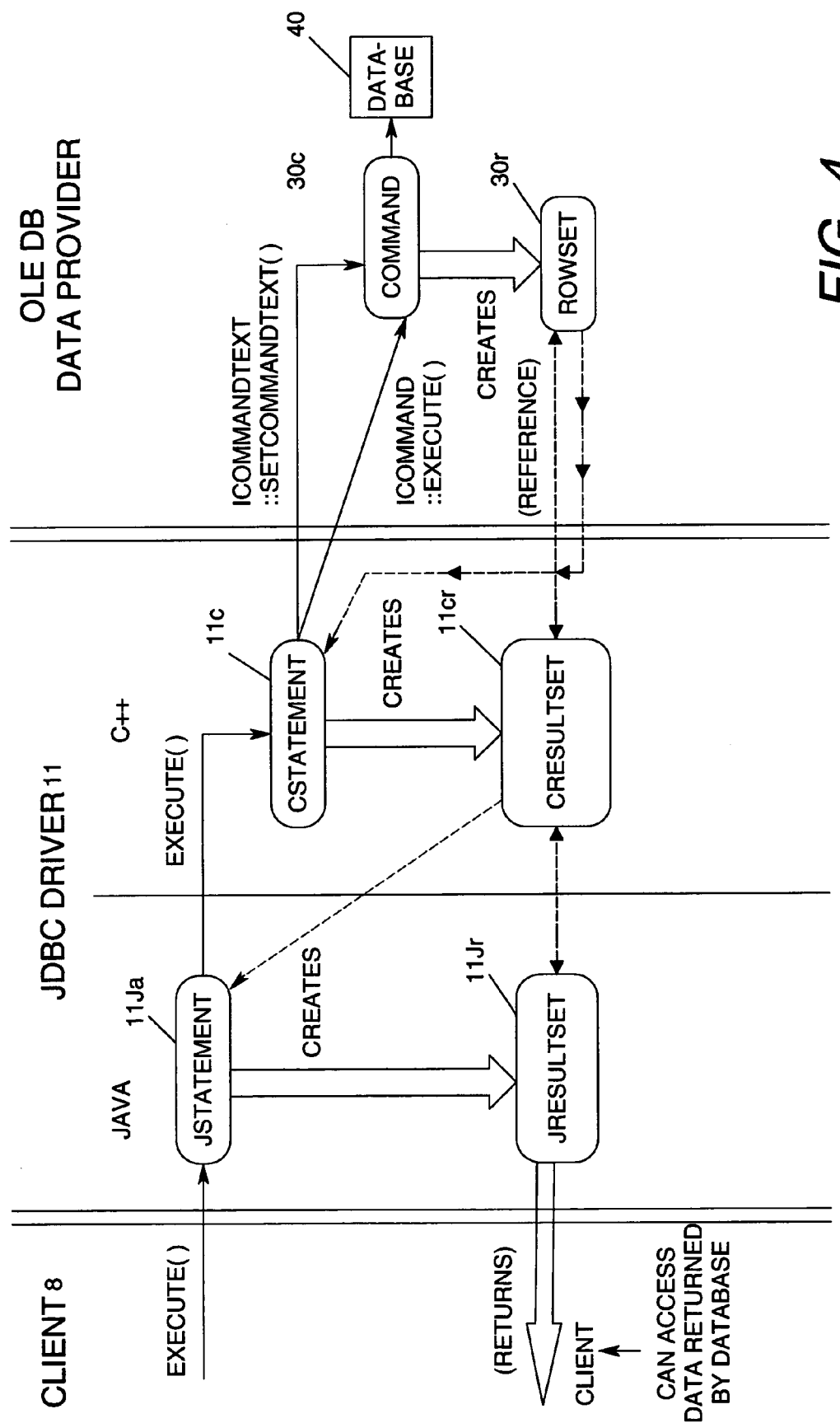
FIG. 4 is a diagram illustrating correspondence of objects between a JAVA class and a corresponding C++ class for each interface defined in the JDBC API.

FIG. 4 is a diagram which illustrates a correspondence of objects using the JDBC Statement interface, as one particular example.

FIG. 4 illustrates two separate interfaces, whereupon the Client 8 interfaces the JDBC Driver 11 which interfaces the OLE DB 30 Data Provider.

One major focus to the present system and method is that for each interface defined in the JDBC API, there exists both a JAVA class and a corresponding C++ class. A JAVA object maintains a reference to its corresponding C++ object. The C++ object in turn, maintains a reference to the OLE DB object 30 that most closely matches the functionality of the JDBC interface. In most cases, the C++ object maintains references to multiple interfaces defined by the OLE DB object, since it takes combinations of various interfaces to implement the desired JDBC functionality.

Thus, the diagram of FIG. 4 illustrates the correspondence of objects by using the JDBC Statement interface as a particular example. The JStatement object 11*ja* represents the JDBC Statement interface.

The Statement interface is implemented by the JStatement class 11*ja*. Assuming that the Client application invokes the execute method, passing a database query, then the JStatement object 11*ja* calls the execute function on the corresponding C++ CStatement object 11*c*. This object in turn, calls two functions on two different interfaces of the corresponding OLE DB Command object 30*c*. To indicate a concrete example:

The Java application wants to find all of the employees in the database. To do that, it uses the SQL database query "SELECT*FROM EMPLOYEES", assuming that the database contains a table called EMPLOYEES. To do this, it creates a JStatement object 11*ja* passing that SQL query to the object. The JStatement object 11*ja* creates a CStatement object 11*c*, passing the SQL query to it. The CStatement object creates an OLE DB Command object 30*c* and passes the SQL query to it. The OLE DB Command object 30*c* issues the SQL query to the database and receives the data back, which is a table consisting of the employees in the database. The OLE DB Command object 30*c* creates an OLE DB Rowset object 30*r* and places the employee information into the OLE DB Rowset object, and returns that object to the CStatement object 11*c*. The CStatement object 11*c* creates a CResultSet 11*cr* passing a reference to the OLE DB Rowset object 30*r* to it. The CStatement object 11*c* returns a reference to the CResultSet object 11*cr* to the JStatement object 11*ja*, which creates a JResultSet object 11*jr*, passing the reference to the CResultSet object 11*cr* to it. The JResultSet object 11*jr* is returned to the Java application. The Java application can then use the API defined by the JDBC to access the employee information using the JResultSet object 11*jr*. When it does so, the JResultSet object 11*jr* calls on the CResultSet object 11*cr*, which calls on the OLE DB Rowset object 30*r*, which passes the data about the employee back to the CResultSet object 11*cr*, which passes the data about the employee back to the JResultSet object which passes the data about the employee back to the Java application.

The ICommandText::SetCommandText (FIG. 4) functions to set the text for the query, and secondly, the ICommand::Execute command works to execute the query. The Command object 30*c* communicates the desired query to the database which performs the query and returns results. The Command object 30*c* creates a Rowset object 30*r* to handle the results of the query and passes a reference to that Rowset object back to the CStatement object 11*c*.

The CStatement object 11*c* creates a CResultSet 11*cr* making it reference the Rowset object 30*r*, and passes a reference to the newly-created CResultSet object 11*cr* back to the JStatement object 11*ja*. The JStatement object 11*ja* creates a new JResultSet object 11*jr*, making it reference the corresponding CResultSet object 11*cr*, and returns a reference of the JResultSet object 11*jr* to the Client 8. The Client 8 can then use the JResultSet object 11*jr*, which implements the ResultSet interface defined by JDBC, to access the data returned by the database for the query.

Figure 5:
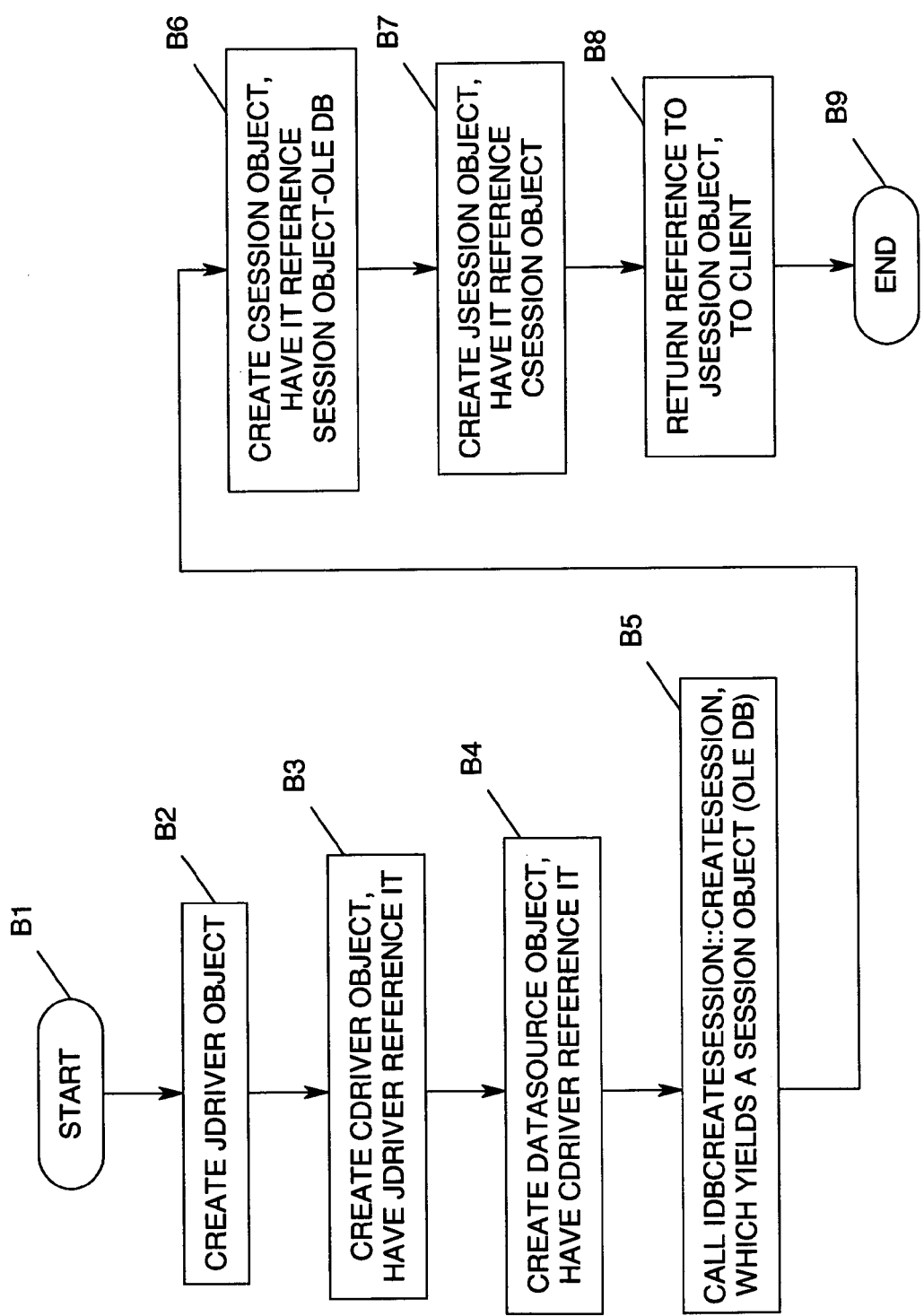
FIG. 5 is a flowchart drawing which illustrates the process of establishing a connection with the database.

Now referring to FIG. 5, there is seen a flowchart illustrating the process of establishing a connection with the database. The process begins with the Start bubble B1, followed by the creation of the JDriver object which is a JAVA object at block B2. Then the CDriver object (a C++ object) is created and the JDriver object is modified to reference this newly created CDriver object in step B3.

The OLE DB DataSource object is created next and the CDriver object is modified to reference this newly-created DataSource object at step B4. The CreateSession function of the IDBCreateSession interface, implemented by the DataSource object is then called, which yields an OLE DB Session object, as seen in step B5.

Then a CSession object (a C++ object) is created and made to reference the OLE DE Session object at step B6. A JSession object (a JAVA object) is created and made to reference the CSession object at step B7. A reference to the newly-created JSession object is returned to the client application at step B8. The process is exited at the end bubble B9.

Figure 6:
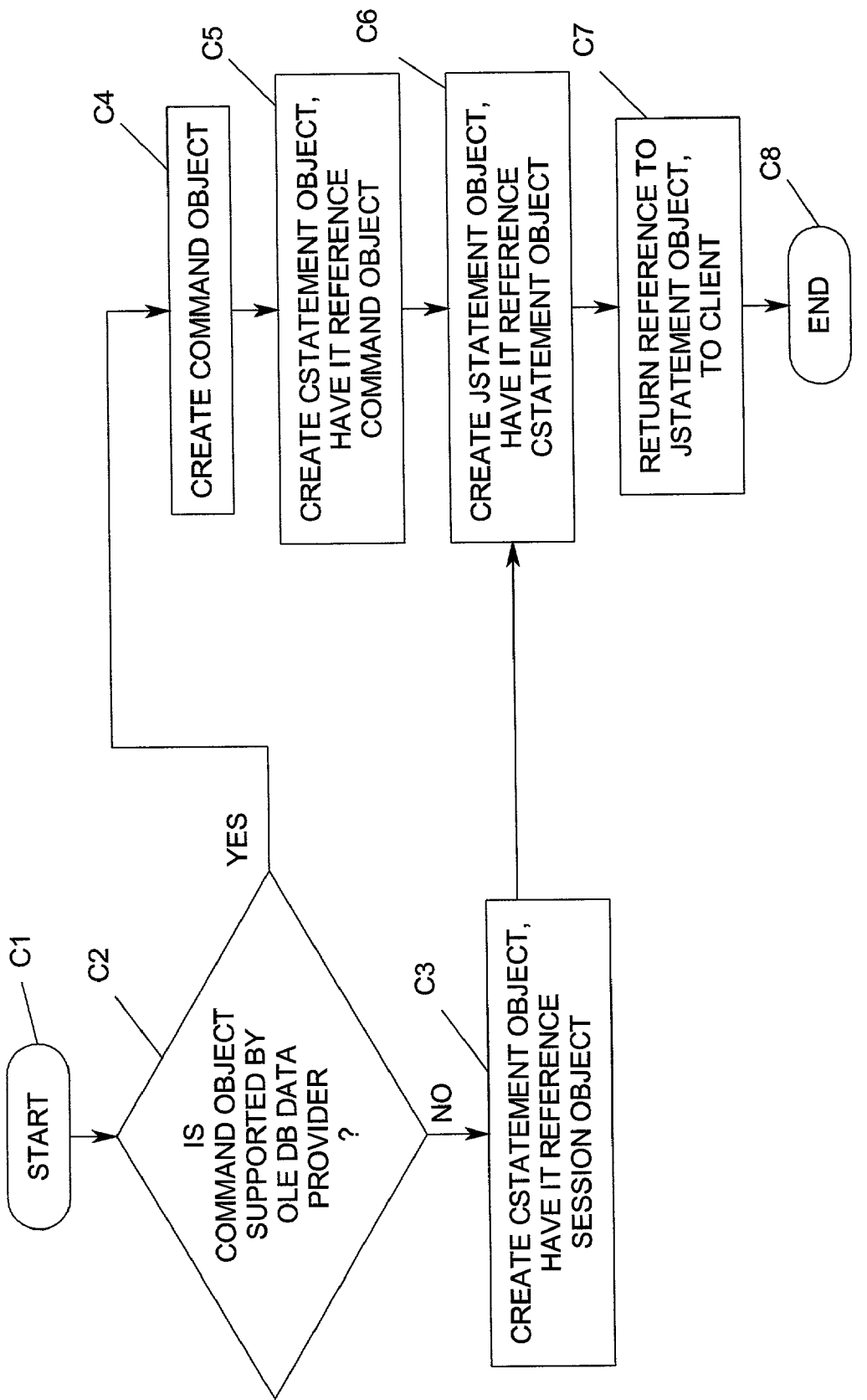
FIG. 6 is a flowchart that illustrates the process of creating a Statement Object.

Seen in FIG. 6 is a flowchart illustrating the process of creating a Statement object. The process begins with the Start bubble C1, followed by an inquiry as to whether or not the OLE DB data provider supports Command objects, as shown in the decision diamond at step C2. If so, (YES) the Command object is created at step block C4 and then the C++ CStatement object is created which will reference the Command object at step block C5.

If the OLE DB data provider does not support command objects (NO), then a C++ CStatement object is created which will reference the Session object created in the previous diagram of FIG. 5 (step B5) which is shown at block step C3 (FIG. 6). In either case, the processing continues with step C6 (FIG. 6) in the creation of the JStatement object (a JAVA object) which is set to reference the newly-created CStatement object as seen in step block C6 (FIG. 6). A reference to the newly-created JStatement object is then returned to the client application at block step C7 (FIG. 6). That process is then exited and ended as seen by the End bubble at step C8.

Figure 7:
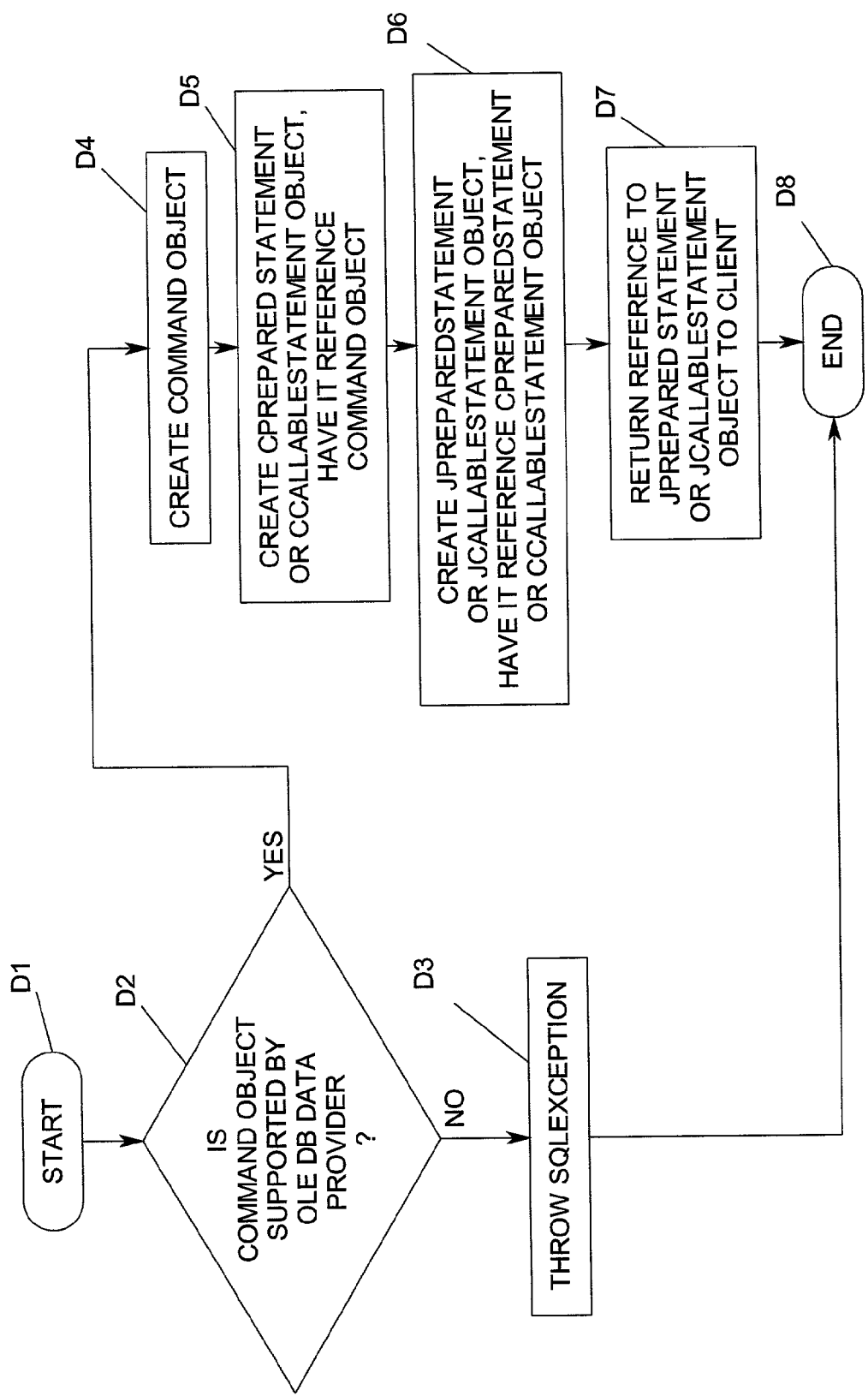
FIG. 7 is a flowchart illustrating the process of creating a *PreparedStatement or CallableStatement object.

Now with reference to FIG. 7, there is seen a flowchart to illustrate the process of creating a PreparedStatement object or a CallableStatement object.

The process begins with a Start bubble at step D1 followed by an inquiry as to whether or not the OLE DB supports Command objects or not, as seen at the decision diamond of step D2.

If the OLE DB does not support command objects (NO), then an SQLException is thrown at step D3, and the process exits at the End bubble step D8.

If the Command object at step D2 is supported (YES), the Command object is created at step D4, and then the C++ CPreparedStatement or the CCallableStatement object is created which will then reference the Command and object at step D5. Processing continues at step D6 with the creation of the JAVA JPreparedStatement or the JCallableStatement object, which is set to reference the newly-created CPreparedStatement or CCallableStatement object at step D6.

A reference to the newly-created JPreparedStatement or the JCallableStatement object is returned to the Client application at step D7. Then, the process is exited as seen by the End bubble step D8.

Figure 8:
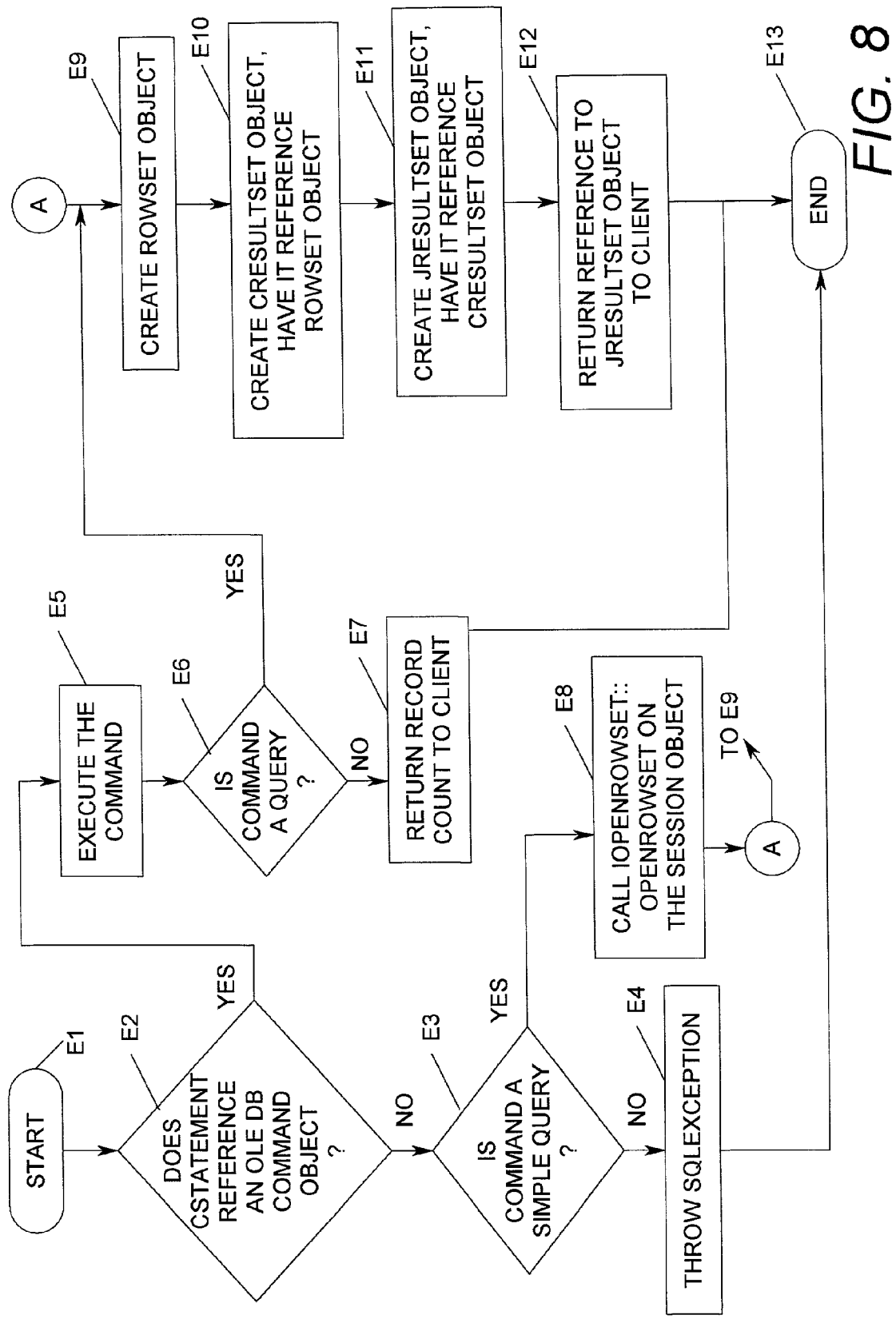
FIG. 8 is a flowchart illustrating the process of executing a database command.

A flowchart is shown in FIG. 8 that illustrates the process of executing a database command using a JStatement object.

The process begins with the Start bubble E1 followed by an inquiry as to whether or not the C++ CStatement object references an OLE DB Command object, as seen in the decision diamond step E2. If this is the case (YES), the command is executed at step E5 which is followed by an inquiry as to whether or not the Command is a query, as seen in the decision diamond step E6. If the Command was a query (YES), then an OLE DB Rowset object is created to handle the query results at step E9.

Then a C++ CResultSet object is created which will reference the Rowset object at step E10. Processing continues with the creation of the JAVA JResultSet object which is set to reference the newly-created CResultSet object at step E11.

A reference to the newly-created JResultSet object is returned to the Client application at step E12 and then the process is exited as seen by the End bubble E13.

If the Command at step E6 was not a query (NO), it will have generated a count of the number of database records affected by the command, and this record count is returned to the Client at step E7, after which the process exits at the End bubble step E13.

If the CStatement at step E2 does not reference an OLE DB Command object (NO), then it must be that the OLE DB data provider does not support Command objects, so that processing continues with an examination of the Command text to determine (step E3) if the command is a simple query, such as the SQL query text ("SELECT*FROM table") at the decision diamond step E3. If so (YES), the OpenRowset function of the IOpenRowset interface supported by the Session object is then called at step E8. This call yields a result much the same as executing a query command, so that processing continues with creation of a Rowset object to handle the query, as seen at step E9 via marker A, and so on through steps E10 to E13.

If at step E3, the command was not a simple query (NO), then an SQLException is thrown at block step E4 and the process then exits at the End bubble E13.

Figure 9:
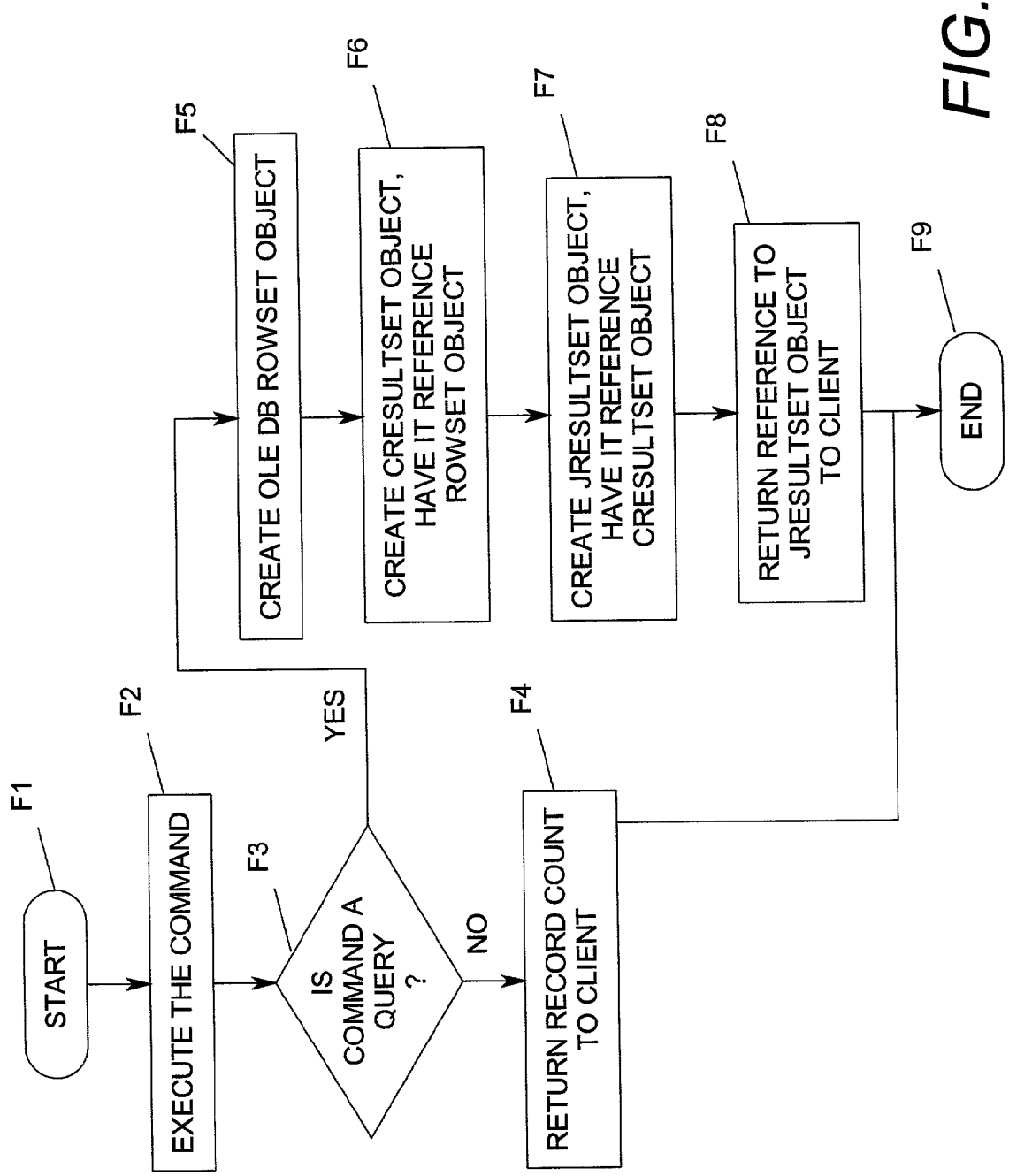
FIG. 9 is a flowchart illustrating the process of executing a database command using a JPreparedStatement or JCallableStatement object.

Now referring to FIG. 9, there is seen a flowchart that illustrates the process of executing a database command using a JPreparedStatement or a JCallableStatement object.

Here in FIG. 9, the process begins with the Start bubble F1, followed by the Command execution at step F2 which is followed by an inquiry as to whether or not the command is a query, seen as a decision diamond at step F3.

If the command was a query (YES), then an OLE DB Rowset object is created to handle the query results at step F5. Then, a C++ CResultSet object is created which will reference the Rowset object at step F6.

Processing continues with the creation of the JAVA JResultSet object which is set to reference the newly-created CResultSet object at step F7.

A reference to the newly-created JResultSet object is returned to the Client application at step F8, and then the process is exited as seen by the End bubble at step F9.

If the command at step F3 was not a query (NO), it will have generated a count of the number of database records affected by the Command, and this record count is then returned to the client at step F4, after which the process exits at the End bubble F9. Part of the JDBC API specification requires that when the database is updated, that a count of the number of records updated be returned to the Java application.

Figure 10:
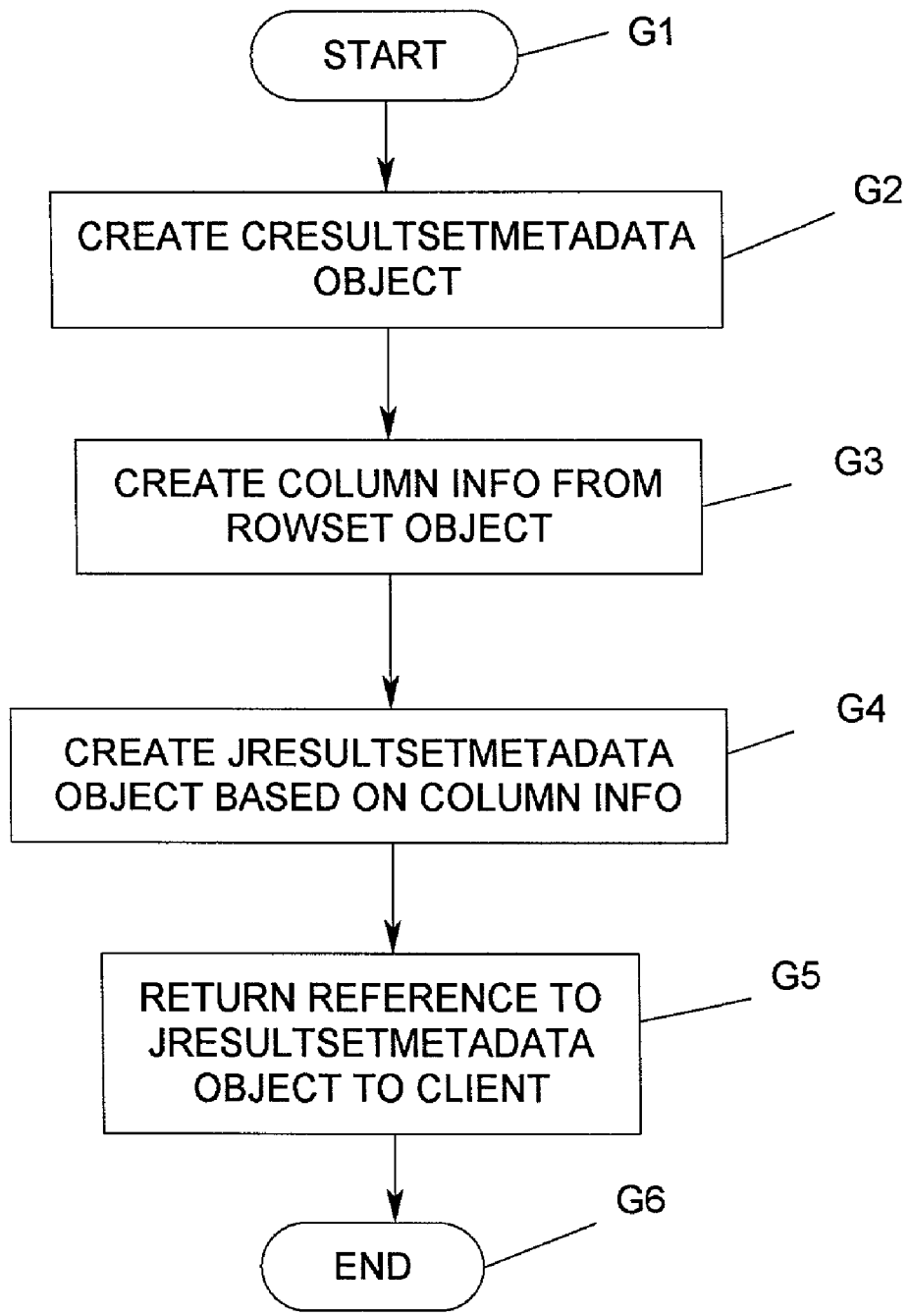
FIG. 10 is a flowchart illustrating the process of obtaining the ResultSetMetaData object for a given ResultSet object.

Now with reference to FIG. 10, there is seen a flowchart that illustrates the process of obtaining the ResultSetMetaData object for a given ResultSet object.

Here, the process begins with the Start bubble G1, followed by the creation of the C++ CResultSetMetaData object as seen in step G2. This object obtains the column information from the Rowset object, as seen in step G3, which is used to create the JAVA JResultSetMetaData object at step G4. This is returned to the Client application at step G5, after which the process exits at the End bubble G6.

Figure 11:
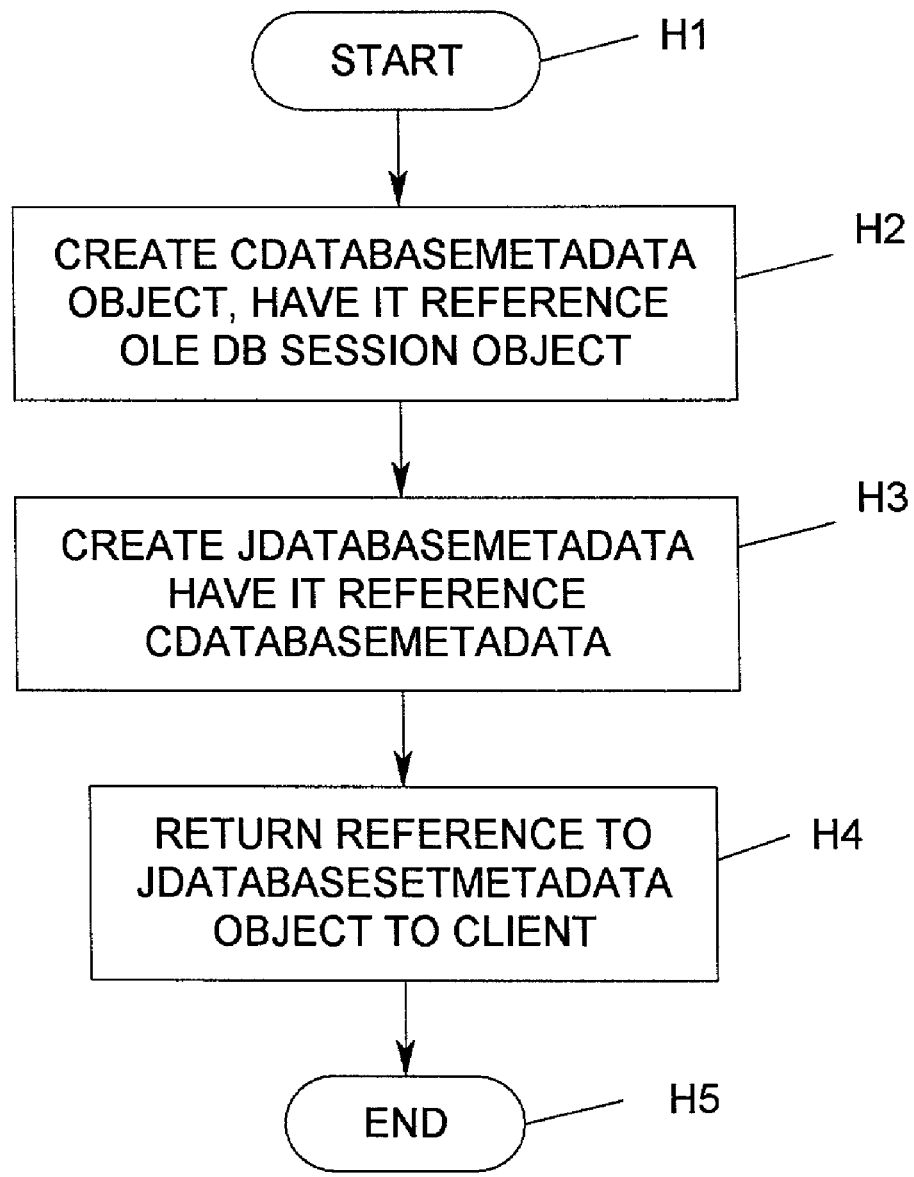
FIG. 11 is a flowchart that illustrates the process of obtaining the DatabaseMetaData object for the session.

A flowchart that illustrates the process of obtaining the DatabaseMetaData object for the Session is shown in FIG. 11. The process begins with Start bubble H1, followed by the creation of the C++ CDatabaseMetaData object which references the OLE DB Session object (22, FIG. 2) seen at step H2.

Processing continues with the creation of the JDatabaseMetaData object which references the CDatabaseMetaData object seen at step H3, which is returned to the Client application at step H4, after which the process exits with the End bubble H5.

Figure 12:
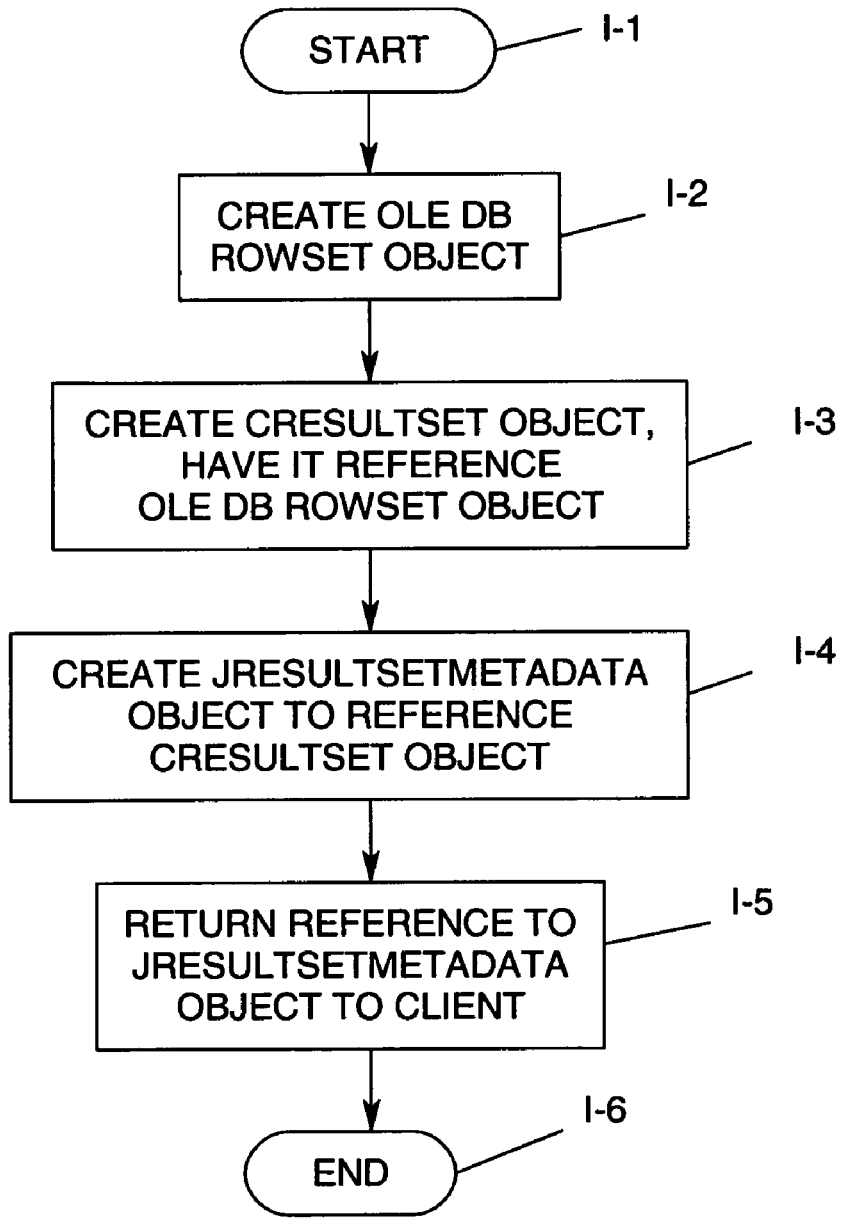
FIG. 12 is a flowchart illustrating the process of obtaining a ResultSet object from the database and obtaining the corresponding ResultSetMetaData object.

FIG. 12 is an illustration using a flowchart to show the process of creating a Rowset object in order to return the JResultSetMetaData object to the client 8.

The process begins with the Start bubble I1, followed by the creation at step I2, of the OLE DB Rowset object. Then a C++ CResultSet object is created which will reference the OLE DB Rowset object at step I3.

Processing continues with the creation of the JAVA JResultSetMetaData object, which is set to reference the newly-created CResultSet object at step I4. A reference to the newly-created JResultSetMetaData object is returned to the client application 8 at step I5, and then the process is exited at seen by the End bubble at step I6.

Described herein has been a method wherein the limitations of the JAVA API have been overcome so that the JAVA API can now exercise the functionality for data access to many types of data sources that previously were only applicable solely to the OLE DB API. Thus, the JAVA API can now function with all of the versatility of OLE DB in accessing all the varieties of databases whether relational, non-relational, flat, directory types, or other forms.

While one embodiment of the described method has been illustrated, it should be understood that other embodiments may still fall within the claims appended hereto.

The invention claimed is:

1. A method for enabling a Java application, that is a client of a JDBC driver, to access data from an object linking-embedding database (OLE DB) via utilization of a Java Database Connectivity (JDBC) interface, comprising the steps of:
   (a) initiating a Java application to contact said Java Database Connectivity (JDBC) driver;
   (b) bridging, by said JDBC driver, to an OLE DB data provider, to provide a JDBC interface between said JDBC driver and said OLE DB database, wherein said bridging step includes the steps of:
   (b1) providing a series of Java classes that implement said JDBC interface;
   (b2) implementing a Datalink Library in C++ for said Java classes to act as an OLE DB client for said OLD DB data provider; and
   (b3) connecting said Java classes to said OLE DB client to enable utilization of said OLE DB data provider.

2. A method for enabling a Java application acting as a JDBC Driver client to access an OLE DB database having OLE DB objects, by utilization of a standard Java Database Connectivity (JDBC) API interface, comprising the steps of:
   (a) establishing, for each interface in said JDBC API interface, a corresponding Java class including Java objects and a corresponding C++ class including C++ objects;
   (b) maintaining in each Java object of said Java class, a reference to its corresponding C++ object in said C++ class;
   (c) maintaining in each C++ object a reference to the OLE DB object which most closely matches the functionality of said JDBC API interface;
   (d) passing, by said C++ object, a database query to said OLE DB database via an OLE DB data provider holding an OLE DB Command Object;
   (e) connecting to said OLE DB database to garner a response to said database query; and
   (f) returning said response to said Java application.

3. A system utilizing a Java JDBC API application specification which is the Java platform standard call level API for database access designated core JDBC 2.1 API by Sun Microsystems, and also utilizing an OLE DB API Specification which is a Microsoft statement for Microsoft Data Access Components of which OLE DB (Object Linking and Embedding Database) is one collection of COM objects that encapsulate database management system services for various servers and data providers and has four OLE DB objects which are DataSource, Session, Command, and Rowset, said system for enabling a client utilizing a Java JDBC API application to access an OLE DB database which is designed for communication with OLE DB-type interfaces comprising:
   (a) JDBC Driver means that utilizes JDBC API Java standards and performs a bridge interface operation between a Java JDBC API application and an OLE DB data provider which implements said OLE DB API specification, wherein said JDBC Driver means includes:
   (a1) a series of JDBC API interfaces wherein each said JDBC API interface contains a Java class holding including Java objects and a corresponding C++ class having C++ object;
   (a2) means to maintain a reference between each java object and its corresponding C++ object;
   (a3) means to maintain a reference between each C++ object and the particular OLE DB object which most closely matches the functionality of the JDBC API interface; and
   (b) means to pass an OLE DB database query initiated by said Java JDBC API application as a client to a database organized for OLE DB API clients and receive a response to said OLE DB database query, wherein the response is in a format suitable for said Java JDBC API application.

4. The system of claim 3 wherein each C++ object maintains a connective reference to multiple interfaces defined by the said OLE DB object.

5. The system of claim 3 wherein said means (b) to pass an OLE DB database initiated by said JAVA JDBC API application as a JAVA client to an OLE DB database organized for OLE-DB API clients, includes:
   (b1) means to create a JDriver object;
   (b2) means to create a CDriver object which provides a C session object;
   (b3) means to make said JDriver object reference itself to said CDriver object;
   (b4) means to create a Data Source object;
   (b5) means to make said CDriver object reference said Data Source object;
   (b6) means to develop a OLE DB Session object;
   (b7) means to make said CSession object reference said OLE DB Session object;
   (b8) means to create a JSession object;
   (b9) means to make said JSession object reference said CSession object;
   (b10) means to return said JSession object to said Java client.

6. The system of claim 5 which further includes:
   (c) means to create a Statement object, said means including;
   (c1) means to query whether said OLE DB Data Provider supports an OLE DB Command object;
   (c2) if no support is provided to said OLE DB command object by said OLE DB Data Provider, then, activation means to create a CStatement object which is referenced to said OLE DB Session object.

7. The system of claim 6 wherein said means (c1) to query whether said OLE DB Data Provider supports an OLE DB Command object indicates a negative (NO) response, includes:
   (c1a) means to catch said negative response as an exception and display an error code.

8. The system of claim 5 wherein if said OLE DB Data Provider does not support (c2) said OLE DB Command object, then said activation means includes:
   (c2a) means to create an OLE DB Command object;
   (c2b) means to create a CStatement object which is referenced to said OLE DB Command object;
   (c2c) means to create a JStatement object which is referenced to said CStatement object;
   (c2d) means to return said JStatement object to said JAVA client.

9. The system of claim 8 wherein said means (c2a) to create an OLE DB Command object includes:

(c2a1) means to create a CPreparedStatement object or a CCallableStatement object which is referenced to said Command object;

(c2a2) means to create a JPreparedStatement object or JCallableStatement object which is respectively referenced to said CPreparedStatement object or said CCallableStatement object;

(c2a3) means to return, to said JAVA client, said JPreparedStatement object or said JcallableStatement object.

10. The system of claim 8 wherein said means (c2b) to create a CStatement object referenced to said OLE DB Command object includes:

(c2b1) means to indicate that said CStatement object does reference said OLE DB Command object;

(c2b2) means to execute said OLE DB Command of said Command object;

(c2b3) means to question if said OLE DB Command object involves a query;

(c2b4) means, if said Command object involves a query, to create a Rowset object;

(c2b5) means to create a CResultSet object which is referenced to said Rowset object;

(c2b6) means to create a JResultSet object which is referenced to said CResultSet object;

(c2b7) means to return to said client, said JResultSet object.

11. The system of claim 10 wherein said means (c2b3) to question said OLE DB Command object indicates that it is NOT a query, then said system includes:

(c2b31) means to return to said JAVA client, a count of the number of records which have been updated.

12. The system of claim 8 wherein said means (c2b) to create a CStatement object referenced to said OLE DB Command object includes:

(c2bn1) means to indicate that said CStatement object does not reference said OLE DB Command object;

(c2bn2) means to indicate that the command to said OLE DB Command object is a simple query;

(c2bn3) means to call the open Rowset function of the IOpenRowset interface which is supported by the Session object;

(c2bn4) means to create a Rowset object;

(c2bn5) means to create a CResultSet object referenced to said Rowset object;

(c2bn6) means to create a JResultSet object referenced to said CResultSet object;

(c2bn7) means to return to said JAVA client, said JResultSet object.

13. The system of claim 8 wherein said means (c2b) to create a CStatement object referenced to said OLE DB Command object includes:

(c2b1) means to indicate that said CStatement object does not reference said OLE DB Command object;

(c2b2) means to indicate that an SQL command to said OLE DB Command object is NOT a simple query;

(c2b3) means to flag an exception condition and display an error message.

14. The system of claim 8 wherein said means (c2a) to create an OLE DB Command object includes:

(f1) means to execute an SQL command;

(f2) means to indicate said command is an SQL query;

(f3) means to create an OLE DB Rowset object to handle said SQL query;

(f4) means to create a C++ ResultSet object which references said Rowset object;

(f5) means to create a JAVA JResultSet object which references said CResultSet object created in clause (f4);

(f6) means to return said JResultSet object to the JAVA client application.

15. The system of claim 14 wherein means (f4) to create said C++ResultSet object includes:

(g1) means to create a CResultSetMetaData object;

(g2) means to acquire column information from said Rowset object;

(g3) means to create a JResultSetMetaData object based on said column information;

(g4) means to return to said JAVA client, a reference to said JResultSetMetaData object.

16. The system of claim 15 wherein said means (g1) to create a CResultSetMetaData object includes:

(h1) means to create a CDatabaseMetaData object which is referenced to said OLE DB Session object;

(h2) means to create a JDatabaseMetaData object which is referenced to said CDatabaseMetaData object;

(h3) means to return to said JAVA client, said reference to said JDatabaseSetMetaData object.

17. The system of claim 15 wherein said means (f3) to create an OLE DB Rowset object includes:

(d1) means to create a C++ResultSet object which is referenced to said OLE DB Rowset object;

(d2) means to create a JResultSetMetaData object based on said column information cited on clause (g3);

(d3) means to return to said JAVA client, a reference to said JResultSetMetaData object.

* * * * *